B. D. SANDERS.
Grain Separator.
No. 306.
Reissued April 10, 1855.
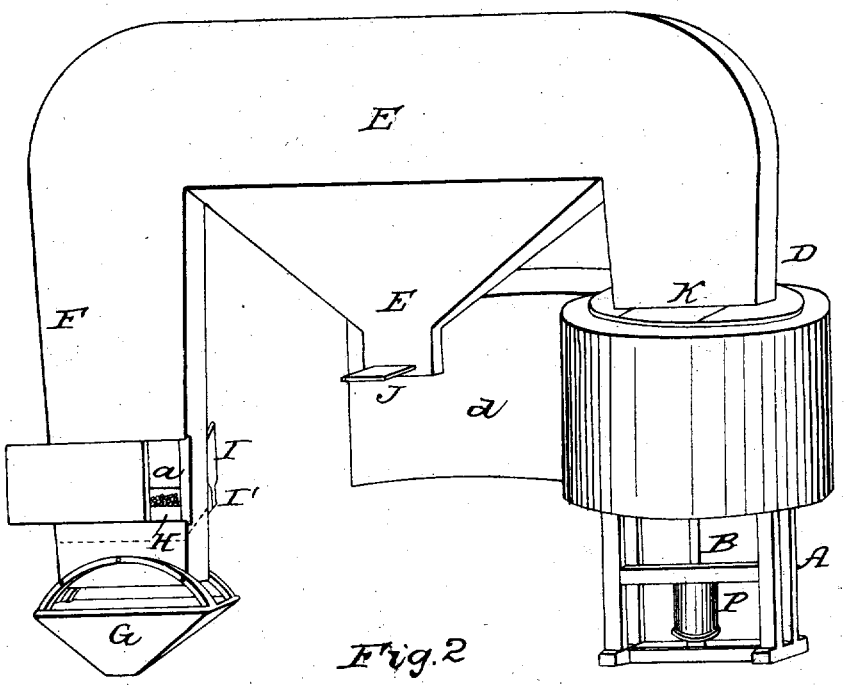
Fig. 2
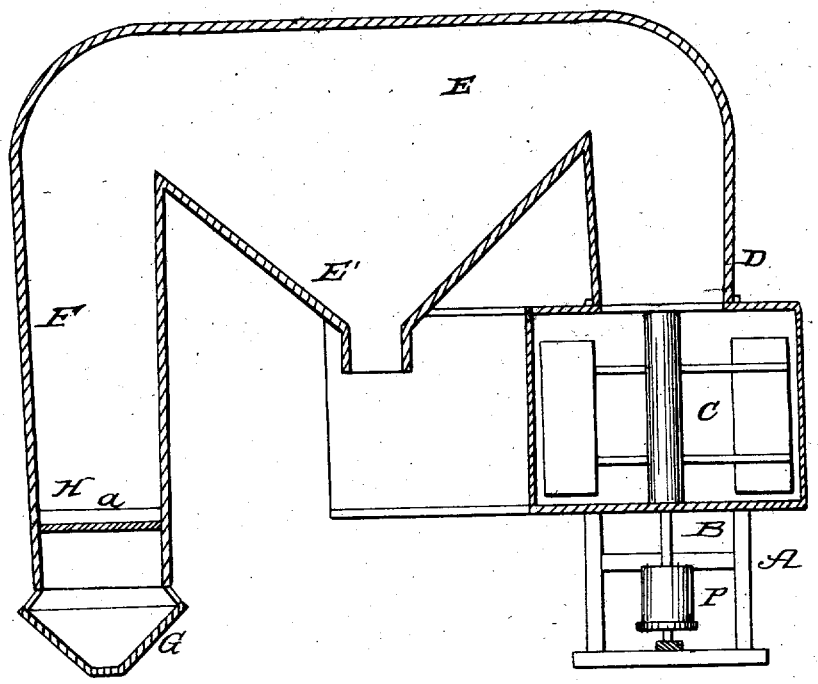
N. PETERS, Photo-Lithographer, Washington, D. C.

UNITED STATES PATENT OFFICE.

B. D. SANDERS, OF HOLLIDAY'S COVE, VIRGINIA.

IMPROVED WINNOWING-MACHINE.

Specification forming part of Letters Patent No. 6,545, dated June 19, 1849; Reissue No. 306, dated April 10, 1855.

*To all whom it may concern:*

Be it known that I, BENJAMIN D. SANDERS, of Holliday's Cove, in the county of Brooke and State of Virginia, have invented a new and Improved Separator or Winnowing-Machine for Cleaning Grain of Chaff, Smut, and other Impurities; and I do hereby declare that the following is a full, clear, and exact description of the same, reference being had to the annexed drawings, making a part of this specification, in which—

Figure 1 is a perspective view of my improved machine. Fig. 2 is a vertical longitudinal section of the same, the plane of section being through the center.

Similar letters of reference indicate corresponding parts in the two figures.

The nature of my invention consists, first, in separating chaff, smut, and other impurities from grain by subjecting the same to a blast within a vertical spout, as will be hereinafter shown, whereby the sound grain, by its superior gravity, is prevented from being carried upward by the blast or current of air, and at the same time the impurities, which are light, follow the current and are drawn through the fan-box and discharged through the longitudinal trunk of the same, the light or imperfect grain being carried upward and lodged within a hopper at the lower part of a horizontal trunk.

My invention also consists in the combination of vertical blast-spouts, screen, hopper, and fan, arranged and operated as will be hereinafter shown and described.

To enable others skilled in the art to make and use my invention, I will proceed to describe its construction and operation.

A represents the frame of the machine, of rectangular form, and provided with a step at its lower end, in which the lower end of a vertical shaft, B, is inserted. On this shaft B a fan, C, is attached, inclosed by a fan-box, the center of which communicates with a vertical spout, D, of any proper form. The upper end of the spout D is connected with a horizontal spout, E, having a hopper, E′, at its lower part or side. The opposite end of the horizontal spout E is connected to a vertical spout, F, which I prefer to have rather larger at its upper than at its lower end. At the lower end of the spout F there is attached a hopper, G. This hopper must be so attached to the spout F that a requisite quantity of air may be admitted into the spout. At about twelve inches from the lower end of the spout F, and within it, there is placed a screen, H, constructed of about No. 9 wire. The grain passes over this screen into the hopper G, which is fixed under it, a space, *a*, being left for this purpose. The grain is conducted to the screen by a spout, I. The grain is made to pass slowly over the screen. At the lower end of the spout there is a slide, I′, to regulate the quantity of grain fed into the screen.

J is a slide at the bottom of the hopper E′. K is also a slide or door to an aperture that communicates with the fan, and by which the amount of draft to the same may be regulated. The fan C is put in motion by any power by a band passing around the pulley on the shaft B. A partial vacuum is formed in the trunk by the motion of the fan C, and the air rushes into the lower end of the spout F, and passes in a current through the screen H, lifting up the chaff and everything specifically lighter than the sound grain, which passes into the hopper G, while the more heavy matter of the refuse is carried over the top of the spout F, and into the horizontal spout E, and falls into the hopper E′. The chaff and other light impurities are carried along through the fan-box, and conducted out by the spout *d*. The trunk F, by being gradually enlarged in area from its lower end upward, prevents any good or sound grain passing into the horizontal spout E, as the strength of the blast of course diminishes with the increased area, and consequently the sound grain cannot be carried over the top of the spout F.

Having thus described my invention, what I claim as new, and desire to secure by Letters Patent, is—

1. The employment or use of a vertical blast-spout, F, gradually enlarged from its lower to its upper end, so that the strength of the blast is decreased in the upper portion of the spout, owing to the increased space or area of the spout, for the purpose of preventing any sound or perfect grain being carried with the light foreign matter over the upper edge of the spout, the blast being formed or generated in said spout in any proper manner.

2. The blast-spout F, either gradually enlarged from below upward or of the same dimensions throughout, and communicating with the atmospheric current through the screen H, in combination with the hopper E′, and the fan placed at the end of the opposite vertical spout D, to separate the chaff and other impurities from the grain, in the manner substantially as herein described.

3. The employment or use of a vertical blast-spout, either gradually enlarged from below upward, or of the same dimensions throughout, when said blast-spout is so arranged that the grain is cleaned or separated from impurities within said vertical spout.

B. D. SANDERS.

Witnesses:

JOS. GEO. MASON,
WILLIAM TUSCH.